US008539997B2

(12) United States Patent
Driftmeyer et al.

(10) Patent No.: US 8,539,997 B2
(45) Date of Patent: Sep. 24, 2013

(54) FILLING HEAD FOR FILLING IN A FLUID INTO A FILLER NECK OF A TANK

(75) Inventors: Michael Driftmeyer, Menden (DE); Alex Klatt, Dortmund (DE)

(73) Assignee: Walter Söhner GmbH & Co. KG, Schwaigern (DE)

( * ) Notice: Subject to any disclaimer, the term of this patent is extended or adjusted under 35 U.S.C. 154(b) by 21 days.

(21) Appl. No.: 13/451,235

(22) Filed: Apr. 19, 2012

(65) Prior Publication Data

US 2012/0267007 A1 Oct. 25, 2012

(30) Foreign Application Priority Data

Apr. 19, 2011 (DE) ........................ 10 2011 007 704
Jul. 14, 2011 (DE) ........................ 10 2011 051 842

(51) Int. Cl.
*B65B 3/04* (2006.01)
*F16L 35/00* (2006.01)

(52) U.S. Cl.
USPC ............ 141/384; 141/94; 141/346; 141/383; 141/392; 285/93; 137/554

(58) Field of Classification Search
USPC ............... 141/94, 383, 384, 386, 346, 311 R, 141/392; 285/80, 81, 86, 91, 93; 137/554
See application file for complete search history.

(56) References Cited

U.S. PATENT DOCUMENTS 5,732,840 A * 3/1998 Foltz ............................ 220/86.2
8,336,587 B2 * 12/2012 Rosenquist et al. .......... 141/384
2007/0209716 A1 9/2007 Rankin
2010/0213705 A1 8/2010 Williams et al.

FOREIGN PATENT DOCUMENTS

| | | | | |
|---|---|---|---|---|
| DE | 19640487 A1 | 5/1997 | | |
| DE | 102005029061 A1 | 1/2007 | | |
| EP | 1538125 A1 | 6/2005 | | |
| EP | 2281774 A1 * | 2/2011 | .................... | 141/392 |
| FR | 2911593 A1 | 7/2008 | | |
| WO | WO2007129958 A1 | 11/2007 | | |

OTHER PUBLICATIONS

EPO (ISA/EP), European Search Report from EP Appl .No. 12164816.6-2316 dated Aug. 6, 2012 (with English translation attached), total 8 pages.

* cited by examiner

*Primary Examiner* — Timothy L Maust
*Assistant Examiner* — Timothy P Kelly
(74) *Attorney, Agent, or Firm* — Christensen O'Connor Johnson Kindness PLLC

(57) ABSTRACT

A filling head 10 is described for filling in a liquid into a filler neck of a tank 14. To ensure highly reliable operation, a rotary connecting element 26 is provided to form a mechanical connection by rotating in relation to the filler neck of the tank 14. A rotatable operating part 30 serves to rotate the rotary connecting element 26. The operating part 30 is coupled to the rotary connecting element 26 by means of a torque-limiting coupling device 32 that, given a threshold torque, is triggered at least in one direction of rotation and decouples the rotatable operating part 30 from the rotary connecting element 26. A sensor is provided to detect the triggering of the torque-limiting coupling device 32 and to send a release signal for the established connection.

15 Claims, 7 Drawing Sheets

FILLING HEAD FOR FILLING IN A FLUID INTO A FILLER NECK OF A TANK

The invention relates to a filling head for filling in a fluid into a filler neck of a tank.

Such a filling head is provided to connect a filling line, i.e. a hose, pipe, or the like, to a filler neck of a tank such that the filling process can be enabled. It is possible to use such filling heads in many areas and for different liquids. In the context of the present invention, those liquids are considered in particular where even minor leakages represent a problem, and therefore the proper filling process should be specially monitored. This holds true in particular for filling motor vehicle tanks with an aqueous urea solution.

EP 2 281 774 A1 describes a device for filling a container especially with a urea solution. A connecting hollow body with a filler neck collar is provided for being connected to a connecting support element of the tank. The filler neck collar and the filler neck of the tank are connected to each other liquid-tight. A thread or bayonet lock is provided for the connection. A filling and ventilation element is provided to supply liquid and remove the displaced air through a filling tube. At the tip of the filling tube, a valve element is provided that opens when the flow pressure of the liquid is sufficient, thereby enabling the filling process. The filling device has two sensors by means of which operation is monitored, that is, a level sensor by means of which it can be determined whether the liquid level of the liquid dispensed through the filler neck of the tank has already reached the filling and ventilation element, and a position sensor by means of which it can be determined if the filling device is correctly connected to the filler neck of the tank. The position sensor is an optical sensor that identifies the correct position of the top edge of the filler neck of the tank and reports it to electrical controls. The filling process can only start when the position sensor receives the signal that the filler neck of the tank is connected to the filling device in the correct position and sealed.

The object of the invention is to propose a filling head that is particularly secure against misuse.

This object is achieved by a filling head according to claim 1. Dependent claims refer to advantageous embodiments of the invention.

According to the invention, the filling head has a connecting part for connecting to the filler neck of a tank. The connection is preferably liquid-tight to prevent liquid from leaking. To create a mechanical connection, a rotary connecting element is provided, i.e., for example a bayonet lock or screwed connection that forms a connection by rotating relative to the filler neck of the tank. The mechanical connection is preferably designed such that it cannot be released by simply pulling the filling head off of the filler neck of the tank, but is rather released by rotating in the direction opposite the direction of connection. This ensures on the one hand that the connection will not independently loosen or be unintentionally released. On the other hand, a seal can also be ensured through the rotation, for example, by means of a thread or lock.

In addition, the filling head has a torque limitation for the rotary connecting element, e.g. threads. Such torque limitation is useful to prevent misuse by excessively tightening the rotary connection. Torque limitation is realized by means of a torque limiting coupling device that forms a releasable coupling between a rotatable operating part, especially suitable for manual operation, and the rotary connecting element. This coupling is designed such that, at least in one direction of rotation, the rotary connecting element also rotates with the operating part rotating as long as the torque remains below a threshold torque. Once the connection between the rotary connecting element and the filler neck of the tank is completely established, that is, the rotary connecting element is fixed there, further operation, i.e., for example the exertion of manual force on the operating part, increases the torque. Above the threshold torque, the torque-limiting coupling device is released and decouples the operating part from the rotary connecting element, thus permitting further rotation of the operating part without an increased torque being transmitted to the rotary connecting element. This prevents the rotary connection between the rotary connecting element and the filler neck of the tank from being overloaded which could otherwise damage the connection or prevent its manual release.

According to the invention, a sensor is provided to determine the triggering of the torque-limiting coupling device and, in case such triggering took place, to send a release signal for the established connection. After the release signal is evaluated, the filling process can start.

The torque limitation is thus not only used as a mechanical safety function to prevent damage, it can also serve to indicate that the connection has been properly established. The release signal that is preferably output by a control device, the filling process being enabled by the control device only after the release signal is available, requires the filling head to be placed on a correct and appropriate filler neck. It also requires that the rotary connection has been engaged up to the threshold torque. This ensures that the connection is sufficiently tight and, if applicable, sufficiently sealed before the release signal enables the filling process. The release signal indicates that the connecting part is correctly positioned on the filler neck of the tank, thereby excluding the danger of improper filling. In addition, the release signal also indicates that the rotary connection has been established with sufficient tightening torque, thereby providing a seal.

Various mechanisms can be used for triggering. Whereas a purely mechanical design of the torque-limiting coupling device is preferred for a simple, reliable and economical solution, the actual measurement of the torque and corresponding actuation can also be electromechanical. It is particularly preferable for the torque-limiting coupling device to have at least one locking element such as a locking pawl that establishes a nonrotating coupling in a first position and does not form such a nonrotating coupling in a second, triggered position, thereby decoupling the rotatable operating part from the rotary connection element. It is also preferable for the locking element to be spring-loaded in the direction of the first position, i.e., establish the coupling in a basic position, wherein the decoupling preferably occurs by a movement (shifting, rotation, etc.) of the locking element against the spring loading.

Thus a latching connection is preferable as the torque limiting coupling, that has a latching stroke upon triggering. This latching stroke can be detected with a suitable sensor.

A plurality of locking elements are preferred so that the locking function and the arising forces are distributed over a larger area. The locking elements are preferably arranged in a circle.

According to a development of the invention, the locking element is movably, particularly preferably shiftably, mounted between the first position (coupling) and the second position (decoupling), preferably with only one degree of freedom. The shift can for example occur in a radial direction. As explained in the context of the following discussion of exemplary embodiments, it is however preferable for the locking element to be axially shiftable in relation to the direction of rotation of the operating part or the rotary connecting element (or particularly preferably both). A coupling device can for example be formed such that a first and second coupling part are arranged axially adjacent to each other and are coupled in the first position by one or more locking elements and decoupled from each other when the locking element(s) is/are shifted into the second position axially with reference to the common direction of rotation.

According to a development of the invention, the locking element and/or the operating part and/or the rotary connecting element have a contact surface that is inclined at an angle in relation to the direction of displacement of the locking element. Alternately to a straight surface with a constant angle of inclination, the contact surface can also have a curved shape (bent shape), i.e., a variable angle in relation to the direction of displacement. The locking element and either the operating part or rotary connecting element preferably have mating surfaces with the cited angle or respectively curved shape in relation to the direction of shifting. When torque is transmitted, force is applied to the inclined contact surface. Given the angled arrangement, this force can comprise a force component in the direction in which the locking element is shifted. When transmitted to a rotary element, force is automatically transmitted to the locking element to move it toward its second position (decoupling). By dividing the active force into different force components at the inclined plane formed by the inclined contact surface, the force acting in the direction of the shift can be substantially proportional to the transmitted torque (apart from friction effects, etc.). This allows the threshold for the triggering torque to be specifically set. A triggering characteristic can be specified by means of a variable angle of a curved shape.

As mentioned, the torque-limiting effect of the coupling device exists in at least one direction of rotation, that is, preferably in the closing direction, i.e., the direction in which the rotary connection is tightened between the rotary connecting element and the filler neck of the tank. Different couplings are possible in the opposite direction. Torque limitation can also occur in this case as well. It is however preferable that there is no limitation in the opposite direction of rotation to ensure that the rotary connection can always be released.

In the above-described design of the torque-limiting coupling device with a locking element having a contact surface, different behavior for the opposing directions of rotation can be achieved in that the locking element, and/or the operating part, and/or the rotary connecting element comprise a first and second contact surface having different angles in relation to the shifting direction of the locking element. Preferably, the first contact surface is active when torque is transmitted in a first direction of rotation, and the second contact surface is active when torque is transmitted in the second, opposite direction of rotation. In the first direction of rotation in which the rotary connection is established, the contact surface is preferably inclined. The second contact surface that acts in the second direction of rotation can also be inclined, but it is preferably arranged parallel to the shifting direction (angle of zero degrees) so that no torque limiting is provided in the direction of release.

The triggering of the torque-limiting coupling device can be detected by a sensor in various ways. It is especially preferred to detect the movement of an element on the coupling device by means of a sensor. This can for example be a locking element described above that can move between the first and second position, and the sensor detects the position of the locking element and emits it as an electric signal.

Various types of sensor elements can be used for sensor detection including in particular optical sensors, magnetic sensors and inductive sensors. Inductive sensors and magnetic sensors are preferable because they are immune to contamination.

A light barrier can for example serve as an optical sensor that can detect the shifting of an element of the coupling device. Such a shift can also be determined by means of an inductive sensor. As described below in association with preferred embodiments, it is preferable to use a magnetic sensor where an element of the coupling device has a permanent magnet or a ferromagnetic part, and the approach of an element that generates a magnetic field, or a conductive element, is detected by means of a magnetic sensor such as a GMR sensor, Hall sensor, or a reed switch which is preferable because it can be purely passive. A reed opening switch, i.e., a reed contact, is particularly preferable that is closed in a resting state and opens when a permanent magnet element approaches the coupling device, or a reed changeover contact that switches a central pole between two outputs when a magnetic field approaches. Alternately, a change in distance resulting from triggering, for example between an element of the coupling device and the remaining filling head, can be detected by means of an ultrasonic sensor.

The electric signaling from the sensor can be modified by means of an electric circuit. If for example the sensor signal is not generated as a constant signal but only as a transient signal, e.g. as a pulse, a logic circuit can process this transient signal and e.g. emit it as a constant electrical signal.

In the context of a preferred embodiment, a support element is provided that is shifted from a resting position into a triggered position when the operating part is rotated in the closing direction of the rotary connection and thereby triggers the torque-limiting coupling device. A sensor is provided to determine the position, i.e., either the triggered position or resting position of the support element, and emit it as an electrical signal. A release signal can only be generated when the sensor determines the shift of the support element into the triggered position.

The support element is preferably part of a locking unit that prevents the support element from shifting from the triggered position back into the resting position without first rotating the operating part in the opening direction. The locking unit causes the support element to return to the resting position with the counter-rotation necessary to release the connection. This ensures that, after the rotary connection is established by applying the necessary threshold torque, the support element detected by the sensor initially remains in the triggered position, thus allowing the release signal to be continuously emitted by the sensor. This release signal can be continuously monitored for the duration of the filling process. Under the effect of the locking unit, it continues as long as there is no active counter-rotation.

The support element is moved between the resting position and triggered position preferably by a coupling element. This coupling element is preferably connected to the operating part. The support element is mounted in a guide in relation to the coupling element so that it moves from the resting position into the triggered position when the rotary connecting element rotates in relation to the operating part. As long as the coupling exists between the operating part and rotary connecting element, such a relative rotation does not occur, and the support element remains in the resting position. Only after the torque-limiting coupling device is triggered does the relative rotation occur such that the guide moves the support element from the resting position into the triggered position. A type of sliding block guide is preferable as a guide where on the support element, or preferably on the coupling element, at least one guide rail or guide edge is provided, that triggers the described movement when engaged with an engaging element such as a projection, pin, etc. of the respective other element.

It is particularly preferable for the coupling element and support element to be designed as concentrically arranged ring elements where the guide is arranged in the area between the coupling element and support element.

In a preferred embodiment, the locking unit is formed by a coupling element and support element. The locking unit or guide is preferably formed by cams that engage in pockets in a mating element. The cams can preferably be formed on the coupling element whereas the pockets are provided in the support element. The reverse arrangement is equally possible. It is particularly preferable for the coupling element and a support element to be nested, preferably concentrically, and cams are formed on the inside of the coupling element. The support element can move axially in the resting position. Upon triggering, the support element moves axially, and the travel of the element can be determined by the sensor. The cams of the coupling element engage in the pockets formed in the support element, thereby locking it in the triggered position so that the coupling does not completely engage independent of further actuation in the closing direction; rather, the axial position continues to correspond to the triggered position, and the sensor can continue to transmit the release signal. The cams only slide out of the pockets when there is a counter-rotation in the direction of opening to axially release the coupling element so that it can return into the resting position.

In the following, embodiments of the invention will be described in greater detail with reference to drawings. In the figures.

Figure 1:
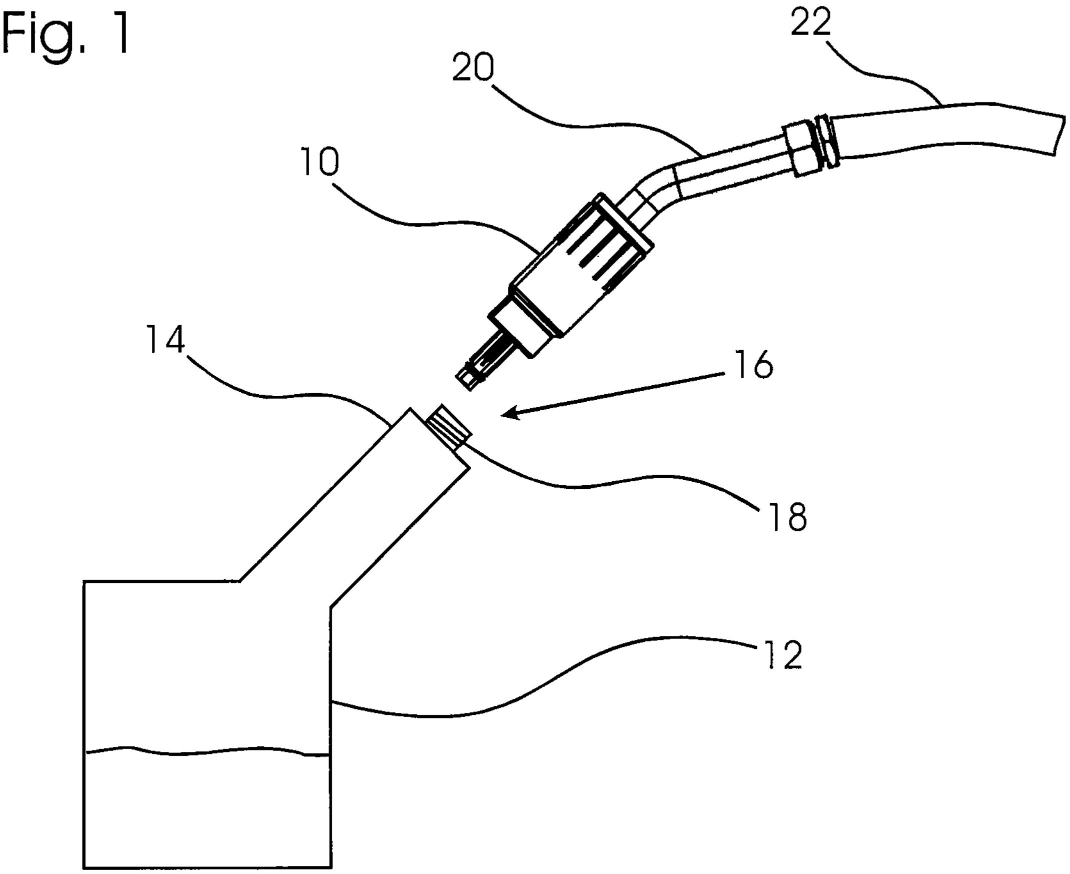
FIG. 1 shows a partial schematic side view of a tank and a filling head arranged in front of it.
Figure 2:
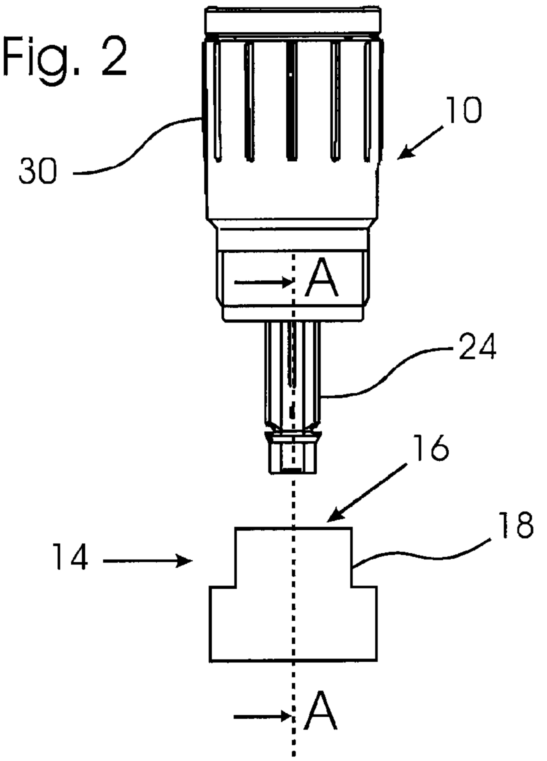
FIG. 2 shows a side view of the filling head and filler neck of a tank from FIG. 1.
Figure 3A:
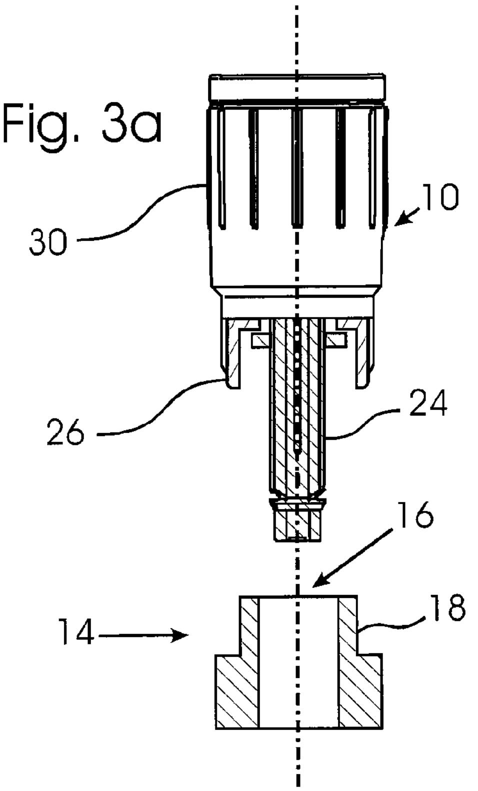
Figure 3B:
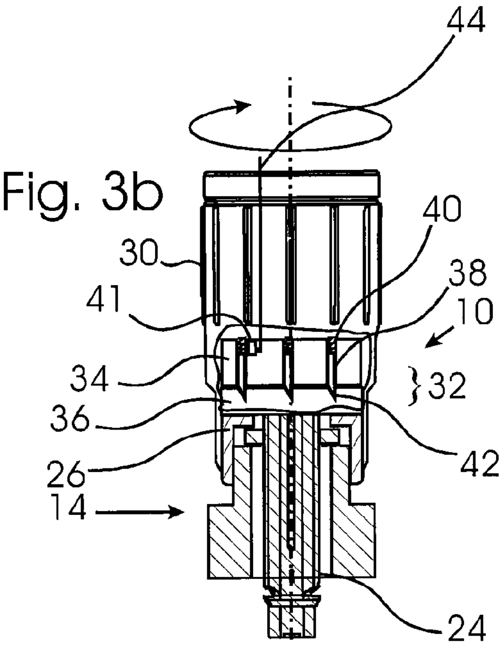
Figure 3C:
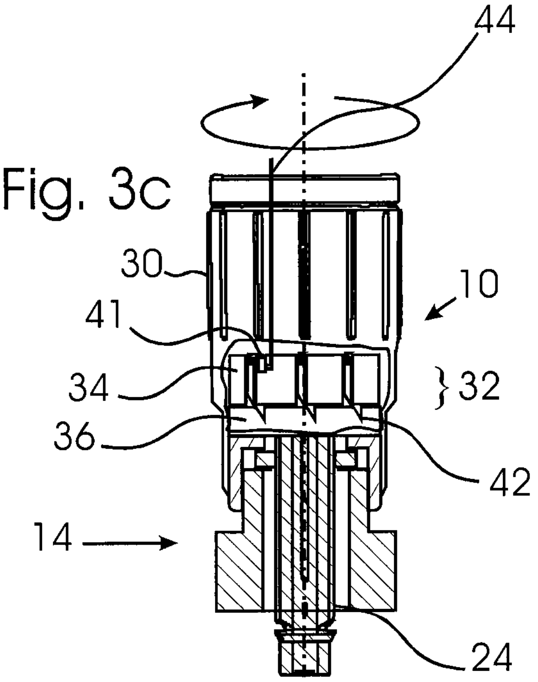
Figure 4:
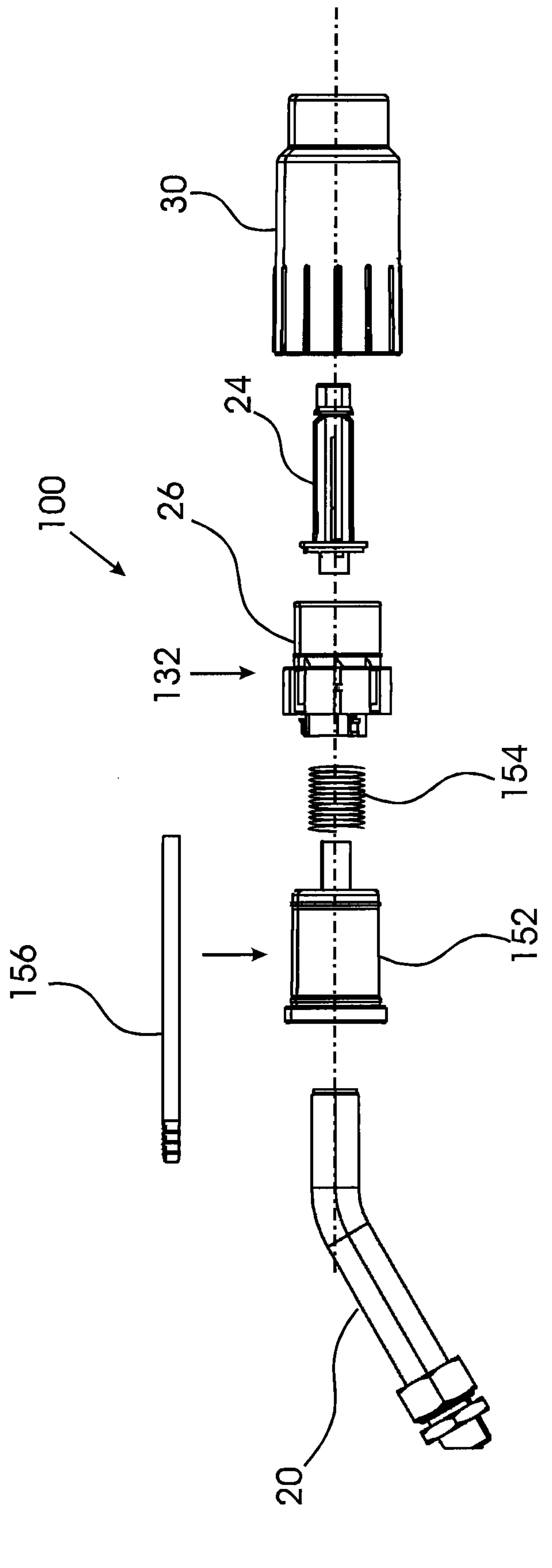
Figure 5:
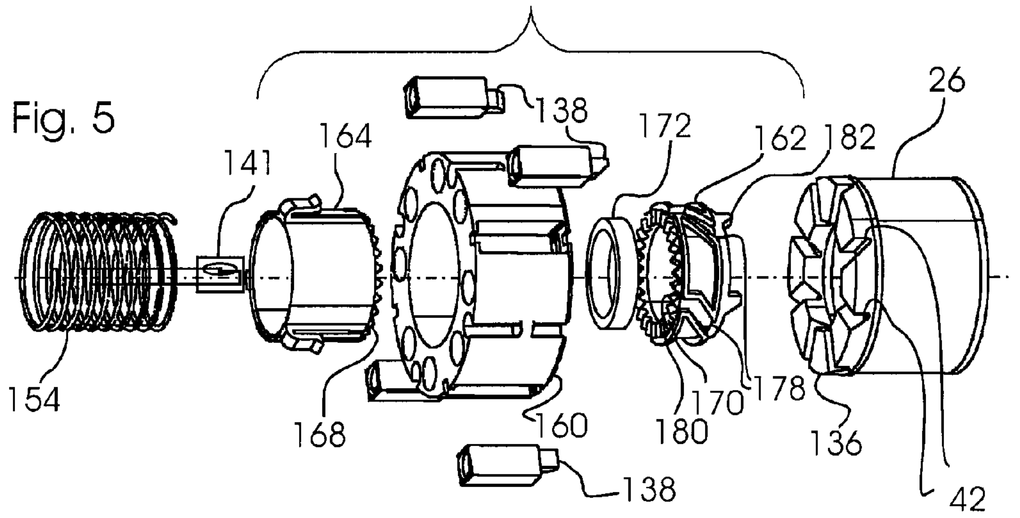
Figure 6:
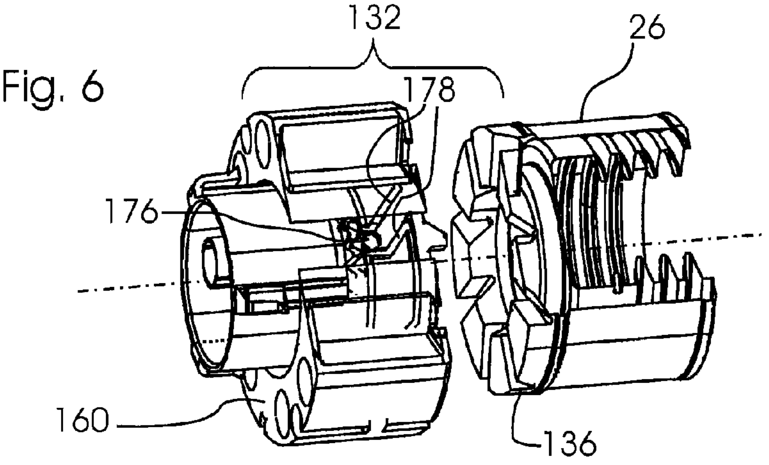
Figure 7:
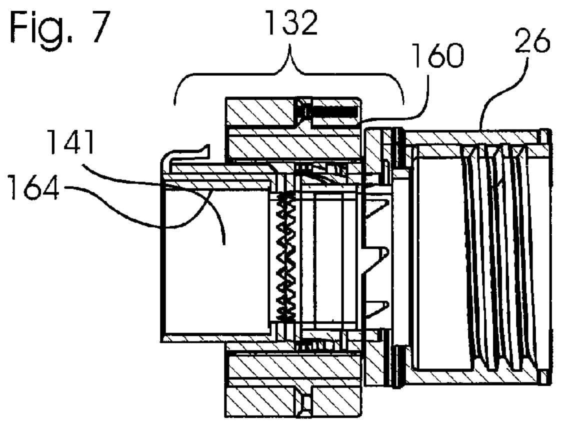
Figure 8:
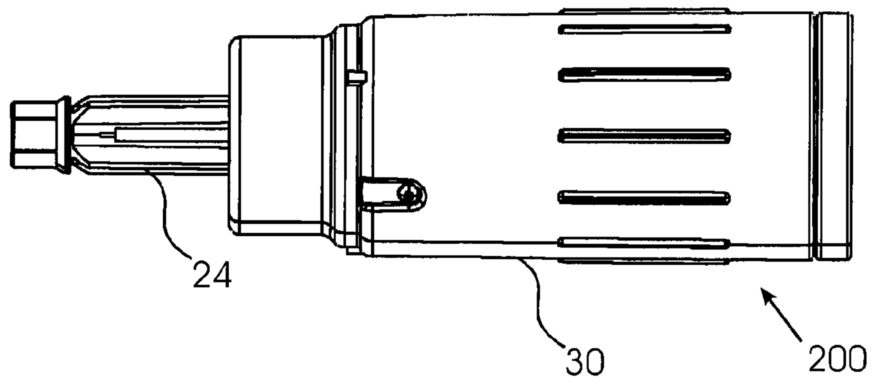
Figure 9:
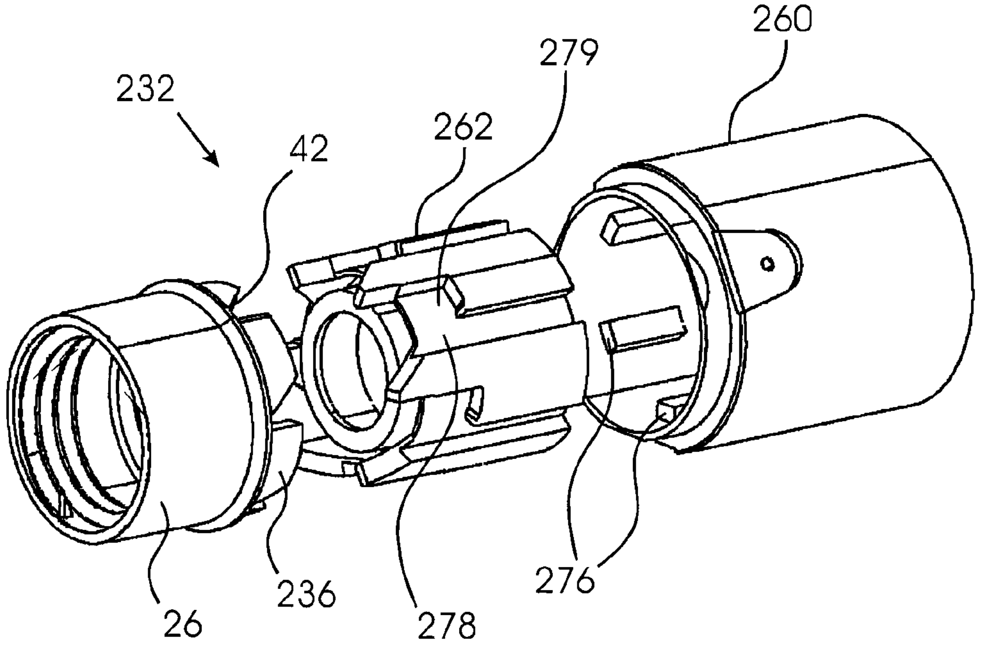
Figure 10:
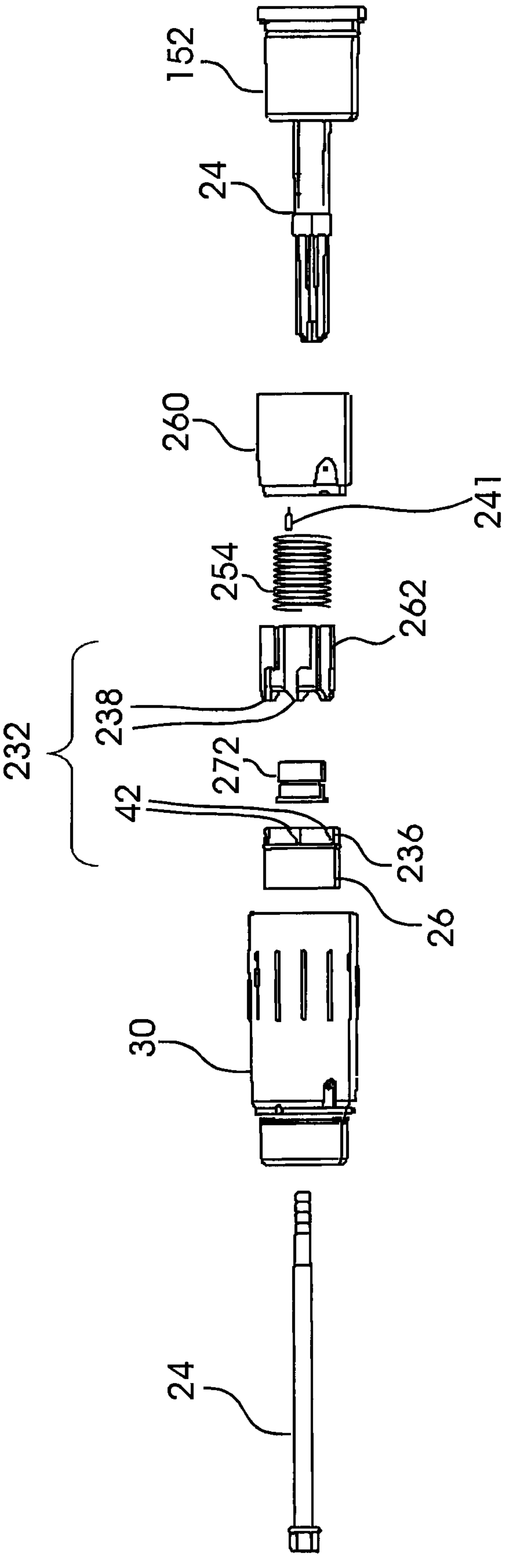

FIG. 3*a*-3*c* show a partial section along the line A . . . A from FIG. 2 with a partial sketch;

FIG. 4 shows an exploded side view of a second embodiment of a filling head;

FIGS. 5, 6 show perspective exploded views of a coupling device of the filling head from FIG. 4;

FIG. 7 shows a longitudinal section of the coupling device from FIG. 5, FIG. 6;

FIG. 8 shows a side view of a third embodiment of a filling head;

FIG. 9 shows an exploded side view of the third embodiment of a filling head according to FIG. 8;

FIG. 10 shows a perspective exploded view of a coupling device of the filling head from FIGS. 8, 9;

FIG. 1 schematically portrays a tank 12 with a filler neck of the tank 14 arranged thereupon and with a filling opening 16 as the terminus surrounded by an outer thread 18.

In front of the filling opening 16, a filling head 10 is arranged that is connected to a filling and ventilation pipe 20 that is connected via a hose 22 to a supply device (tank, pump, etc. that is not shown).

The filling head 10, filling and ventilation pipe 20 and hose 22 in the illustrated example are equipment of a filling station for aqueous urea solution to fill the tank 12 arranged in a motor vehicle. Alternately, this solution can be also employed for other filling tasks using other liquids, especially fuel or other aggressive or hazardous liquids.

As shown in FIG. 2, 3*a*-3*c*, the filling head 10 with the projecting filling and centering pipe 24 is introduced into the filling opening 16 of the filler neck of the tank 14. An inner threaded sleeve 26 as a threaded element on the filling head 10 is screwed onto the outer thread 18 of the filler neck of the tank 14 to ensure a mechanically secure and liquid-tight connection. This is done by rotating the operating sleeve 30. In the addressed example as shown in FIG. 3*a*-3*c*, the screwed connection between the operating head 10 and filler neck of the tank 14 is created by rotating the operating sleeve 30 to the right until a flange on the filling head comes to rest and seals against the filler neck of the tank, and the filling process can begin. In an alternative embodiment, a left-hand thread can for example also be used.

To ensure that the threaded connection 18, 26 is not overtightened, a torque limiting coupling device 32 is provided as shown in the sketched example in FIG. 3*b*, 3*c*. This comprises a first coupling part 34 that is non-rotatably connected to the operating sleeve 30, and a second coupling part 36 that is non-rotatably connected to the threaded element 26. As shown in FIG. 3*b*, the coupling elements 34, 36 are coupled to each other in a resting state by means of locking pawls 38 that are pretensioned in the axial direction by means of spring elements 40 and extend out of guides within the first coupling element 34 into engaging seats 42 in the second coupling element 36.

The locking pawls 38 establish a coupling between the first and second coupling elements 34, 36 so that they are initially non-rotatably coupled.

However, the seats 42 in the second coupling element 36 and the tips of the locking pawls 38 are arranged at an angle, that is, they contact each other at an angle of inclination that is greater than 0° and less than 90° in relation to the axial direction. The inclined plane that this formed generates force which acts within the guides on the locking pawls 38 in an axial direction, i.e., their potential shifting direction, counter to the force of the springs 40 in a rotation in the direction of closing with a corresponding application of pressure to the contact surfaces between the locking pawls 38 and seats 42. Alternately to a flat surface under a constant angle of inclination, a curved shape with a variable angle of inclination could also be used.

If the force generated at the inclined contact surfaces exceeds the spring force, the locking pawls 38 are displaced out of the seats 42 of the bottom coupling part as shown in FIG. 3*c*, and thereby ensure that the bottom coupling part 36 is decoupled from the top coupling part 34. The torque-limiting coupling device 32 is thereby triggered and, due to the decoupling, no longer transmits the torque applied to the operating sleeve 30 to the threaded element 26. Instead, the top coupling part 34 slips with reference to the bottom coupling part 36.

The torque at which the described decoupling occurs depends on the angle of inclination between the contact surfaces of the locking pawls 38 and seats 42 in the bottom coupling part 36, on the pairing of the materials and resulting friction values, on the number of locking pawls 38 and the force of the springs 40. A threshold torque can be set by suitably choosing these elements, wherein the coupling device 32 only transmits torque from the operating sleeve 30 to the threaded element 26 when rotating in the closing direction as long as the torque lies below the threshold. Once the screwed connection is fully established as shown in FIG. 3*c* so that further rotation in the closing direction is impossible, applying torque to the operating sleeve above the threshold torque causes the torque-limiting coupling device 32 to be triggered.

The triggering of the torque-limiting coupling device 32 is detected by a sensor 41 that, depending thereupon, sends a release signal as an electrical signal via an electrical line 44. In the illustrated embodiment, the sensor 41 detects the shift of at least one of the locking pawls 38 within the first coupling part 34. In the home position shown in FIG. 3*b* in which all locking pawls 38 still generate a coupling between the first coupling part 34 and the second coupling part 36, the sensor 41 is arranged at a distance from one of the locking pawls 38. If however this locking pawl 38 shifts axially to the rear as shown in FIG. 3*c* as is the case when coupling device 32 is triggered, the sensor 41 detects the resulting new position of the locking pawl 38 and can emit a release signal.

The sensor 41 can be designed in this case as e.g. an optical sensor to determine the shift of the locking pawl 38 into the second position. The locking pawl 38 can also be designed as a ferromagnetic part, wherein the sensor 41 then can be designed as an inductive or capacitive sensor, or as a Hall sensor, to detect the locking pawl 38 in its second position.

The electrical line 44 is connected to a control device (not shown) for the entire filling station. The control device outputs the sensor signal and only releases the filling process when the release signal indicates that the connection has been established.

Consequently, at first the threaded element 26 of the filling head 10 must be completely screwed onto the filler neck of the tank 14 sufficiently and with such force before starting the filling process to have at least briefly triggered the torque-limiting coupling device 32. In the illustrated embodiment, depending on the resulting state of the coupling element 34, 36, the locking pawl 38 may return to the first coupling position under further rotation, and the sensor will not continue to emit a release signal even though the mechanical connection still exists. This can, however, be taken into account by a logic circuit that turns the transient release signal into a continuous signal, or by corresponding processing in the control device such that, as a result, a short release signal can be treated as sufficient for permanently releasing the filling process.

In a second embodiment of the invention according to FIG. 4-7, this logic function is realized mechanically, i.e., the mechanical design ensures that the release signal of a sensor is applied continuously as long as the connection exists, i.e., the release signal continues until the operating sleeve 30 is rotated in the direction of disconnection.

FIG. 4 shows elements of a filling head 100 according to the second embodiment of the invention. The filling head 100 according to the second embodiment and the filling head 10 according to the first embodiment have a number of commonalities. The same elements are identified by the same reference numbers. The differences primarily arise from the different design of the coupling device.

The individual components of the filling head 100 are shown in the exploded view in FIG. 4. A torque-limiting coupling device 132 is placed on the centering pipe holder 152, wherein a helical spring 154 acts between the elements. A filling and centering pipe 24 is held on the centering pipe holder 152 in an assembled state and arranged coaxially within the coupling device 132. A pipeline 156 connects the filling and ventilation pipe 20 to the filling and centering pipe 24 and serves to conduct the liquid, whereas the air displaced by the liquid while filling can flow back in the area around the line 156.

In the assembled state, a operating sleeve 30 is placed over the outside of the elements of the filling head 100 so that the filling and centering pipe 24 extends therefrom at the front end.

As explained in association with the first embodiment, the operating sleeve 30 serves to operate the filling head 100 when screwing it onto a filler neck of the tank. An inner thread 26 that establishes the screwed connection to the filler neck of the tank is provided as a part of the torque-limiting coupling device 132 shown together with its elements in the enlarged views in FIG. 5-7. In FIG. 5-7, the consistently fixed elements that do not simultaneously rotate, i.e., the centering pipe holder 152 and filling and centering pipe 24, are not shown for the sake of clarity.

As can be seen in the exploded view in FIG. 5, the coupling device 132 has a coupling ring 160 with a support ring 162 and a brake ring 164 arranged coaxially and sequentially within its interior. The brake ring 164 is mounted on the centering pipe holder 152 and is arranged in a nonrotating yet axially displaceable manner. The centering pipe holder 152 always remains fixed when the filling head is screwed onto the filler neck of the tank and therefore does not rotate with the operating sleeve 30 and the coupling ring 160 coupled thereto. In an assembled state (FIG. 7), a magnetic ring 172 is arranged within the support ring 162 and has a magnetic field that can act on a reed switch element 141 depending on the axial position of the support ring 162. In an alternative design (not shown), a more economical bar magnet is used instead of a magnetic ring 172.

The coupling ring 160 in the illustrated example has four locking pawl elements that are evenly distributed over the circumference and each have an axial displaceable locking pawl 138, a housing for guiding the locking pawl 138 in an axially displaceable manner, and a helical spring (not shown) inside to pretension the locking pawl toward the right in FIG. 5-7, i.e., the direction toward the rotary connecting element 26. Fewer or more locking pawls can alternatively be provided. The tip of the locking pawls is designed asymmetrically and, in the illustrated example, has a bevel of approximately 45° to one side, whereas it terminates straight on the other side.

Integral with the threaded element 26 a coupling part 136 is provided with seats 42 which are, adapted to the shape of the locking pawls 138, also designed asymmetrically, beveled on one side and straight on the other side.

In the assembled state, the locking pawls 138 engage in the seats 42 of the coupling part 136 and, in their home position established by the springs, therefore lock the coupling ring 160 to the second coupling part 136 and hence the threaded element 26 to initially create a nonrotating connection. As explained in the context of the first exemplary embodiment, on the one hand the shape of the locking pawls 138 and seats 42 that is beveled on one side as well as the axial displacability and spring-loading of the locking pawls 138 on the other hand form a torque-limiting coupling between the coupling ring 160, that is nonrotatably connected to the operating sleeve 30 when the filling head 100 is in an assembled state, and the coupling element 136 and threaded element 26, and it is triggered in the closing direction of the rotary connection between the threaded element 26 and filler neck of the tank above a threshold torque; however, in the opposite rotational direction, full coupling is generated without torque limitation due to the straight shape of the locking pawls 138 and seats 42.

The purely mechanical function of the torque-limiting coupling device is hence already realized by the locking pawls 138 mounted in the coupling ring 160 and the coupling element 136. Together with the magnetic ring 172 and reed switch 141, the support ring 162 and brake ring 164 that have engaging teeth 168, 170 serve to generate an electrical release signal when the torque-limiting coupling device 132 has been triggered once while screwing the filling head 100 onto a filler neck of the tank, and serve to maintain this electrical signal until the filling head 100 is rotated in the opposite direction in the releasing direction of the rotary connection.

For this purpose, the coupling ring 160 has a plurality of pins 176 distributed over the circumference of its inner surface that project inward toward the support ring 162. On its outer surface, the support ring 162 has matching guide tracks 178 in which the pins 176 are guided.

On the outer surface of the support ring 162, the guides 178 run slanted at an angle of elevation relative to the longitudinal mid-axis and end on the left side in FIG. 5-7 in a straight guide section 180 that runs parallel to the longitudinal mid-axis.

On its right side in FIG. 5-7, the support ring 162 has engaging prongs 182. In a basic state (FIG. 7), that is, without previously triggering the coupling element, the engaging prongs 182 are engaged in the seats 142. At the same time, the teeth 170 of the support ring 162 are engaged in the teeth 168 of the brake ring 164. Under the pressure supplied by the spring 154, the brake ring 164 presses the support ring 162 axially to the right in FIG. 5-7 toward the coupling element 136.

If the filling head 100 is used without triggering the coupling device 132, for example by screwing the threaded element 26 onto a filler neck of a tank without exceeding the threshold torque, the elements of the coupling device 132 shown in FIG. 5-7 all rotate together with the exception of the brake ring 164: The operating sleeve 30 rotates the coupling ring 160 connected nonrotatably thereto with the locking pawls 138, and these cause the coupling element 136 to rotate along with the threaded element 26 integrally connected thereto. Since the engaging prongs 182 are engaged in the seats 42 of the threaded element 136, the support ring 162 also rotates at the same time. The teeth 168, 170 slip in relation to the fixed brake ring 164.

However, if the threshold torque is exceeded, thereby causing triggering of the coupling device 132 and a relative rotation between the coupling ring 160 and locking pawls 138 on the one hand and the coupling element 136 and threaded element 26 on the other hand, the support ring 162 and coupling ring 160 no longer move synchronously. Because the support ring 162 is coupled to the coupling part 136 by means of the engaging prongs 182. This allows relative rotation between the support ring 160 and coupling ring 162.

Under this relative rotation, the pins 176 guided in the guides 178 cause the support ring 162 to shift axially to the left in FIG. 5-7, i.e., opposite the initial tension from the brake ring 164 on which the spring 154 acts. The support ring 162 and the magnetic ring 172 firmly connected thereto hence lift in an axial direction. This causes the reed switch contact 141 to enter the magnetic field of the magnetic ring 172.

The reed switch 141 is designed as an opening contact, i.e., the contact is initially closed without the influence of an external magnetic field so that an electrical short circuit is signaled via the connecting line. The effect of the magnetic field of the magnetic ring 172 that results from the described axial shift of the support ring 162 when the coupling device 132 is triggered opens the reed contact to create an electrical open circuit in the line.

This axially shifted position of the support ring 162 and associated constant release signal (electrical open circuit) exist until the coupling ring 160 is rotated in the opposite direction in the opening direction of the rotary connection. Then the support ring 162 shoves the pins 176 guided in the guides 178 axially back into the position on the right in FIG. 5-7 so that the magnetic ring 172 moves away from the reed switch 174, and the contact is closed after the effect of the magnetic field is removed. The release signal is canceled by the electrical short-circuit generated in this manner.

FIG. 8 shows a filling head 200 according to a third embodiment of the invention. The filling head 200 according to the third embodiment again has extensive commonalities with the previous embodiments. The same elements are identified by the same reference numbers. The differences primarily arise from the different design of the coupling device.

The individual components of the filling head 200 are shown in the exploded view in FIG. 9. As is the case with the second embodiment, a filling and centering pipe 24, a centering pipe holder 152 and operating sleeve 30 are provided.

A torque-limiting coupling device 232 is formed by a threaded element 26 having an inner thread for screwing onto the filler neck of the tank and a support element 262 coupleable thereto having a magnetic ring 272 that as a whole is axially shiftable in relation to the coupling element 260. The support element 262 has a ring of locking pawl elements 238. Integral with the threaded element 26 a coupling part 236 is provided with seats 42 designed asymmetrically beveled on one side adapted to the shape of the locking pawls 238.

In the basic position, the locking pawls 238 engage in the seats 42 of the coupling part 236. A spring 254 acts upon the support ring 262 to ensure its engagement so that the coupling device 232 transmits torque in its basic position.

When the threshold torque is exceeded, the coupling device 232 is triggered as described with reference to the previous embodiments, wherein the support ring 262 shifts axially against the pressure of the spring 254 so that the locking pawls 238 slide out of the seats 42 along their angled contact surfaces. In this triggered position, the coupling device 232 is disengaged and slip occurs.

The axial shift of the support ring 262 and the magnetic ring 272 connected thereto is detected by a reed switch 241 acting as a sensor that emits an electrical release signal when the magnetic ring 272 approaches.

The support ring 262 and coupling ring **26*o* hence form a locking unit. As can be seen in particular in FIG. 9, especially the outer shape of the support ring 262 and the corresponding inner contour of the coupling ring 260 form a lock in the triggered position such that the support ring 262 remains in its axially shifted position, so that the magnetic ring 272 remains positioned next to the sensor 241** and continuously a release signal is emitted.

This lock is caused by cams 276 arranged on the inside of the support ring 260 that engage in a guide profile 278 in the support ring 262. Pockets 279 are hence formed within the guide profile 278 on the support ring 262.

In the resting position, the cams 276 lie within longitudinally extending channels of the guide profile 278, thus rendering the support ring 262 axially shiftable. When the coupling device 232 is triggered by rotation in the closing direction, i.e. to the right in FIG. 10, and the support ring 262 correspondingly shifts axially against the pressure of the spring 254, the cams 276 enter the pockets 279 formed by the guide profile 278 and axially lock the support ring 262 there in the triggered position. The cams 276 are locked in the pockets 279 by projections 281.

The locked connection thus formed is only released upon counter-rotation. The cams 276 overcome the projections 281 and leave the pockets 279 to make the support ring 262 again axially moveable, and the locking pawls 278 slide back into the seats 42. The magnetic ring 272 also moves away from the sensor 141 which causes the release signal to stop.

The particularly simple mechanics of the second embodiment also ensure that the coupling device 232 is reliably triggered when the threshold torque is exceeded, that this triggering is reliably detected by the travel of the support ring 262, and that the release signal emitted by the sensor 241 continues until a counter-rotation is carried out in the opening direction.

Deviations from the illustrated embodiments are possible. In particular, the illustrated embodiments can be combined so that, for example, the inner design of the filling head 10 according to the first embodiment can be formed by a connecting piece, a pipeline and a centering pipe holder as shown for the second embodiment in FIG. 4.

The invention claimed is:

1. A filling head for filling in a fluid into a filler neck of a tank (14), comprising:

a rotary connecting element (26) to form a mechanical connection with the filler neck of the tank (14) by means of rotation, and comprising a rotatable operating part (30) for rotating the rotary connecting element (26), wherein the operating part (30) is coupled to the rotary connecting element (26) by means of a torque-limiting coupling device (32, 132) that, given a threshold torque, is triggered at least in one direction of rotation and decouples the rotatable operating part (30) from the rotary connecting element (26), characterized in that a sensor (41, 141) is provided to detect the triggering of the torque-limiting coupling device (32, 132) and to send a release signal for indicating that the mechanical connection has been established.

2. The filling head according to claim 1, wherein the torque-limiting coupling device (32, 132) has at least one locking element (38, 138) that establishes a non-rotatable connection in a first position, and that decouples the rotatable operating part (30) from the rotary connecting element (26) in a second, triggered position.

3. The filling head according to claim 2, wherein the locking element (38, 138) is spring-loaded in the direction of the first position.

4. The filling head according to claim 2, wherein the locking element (38, 138) is movably mounted between the first and second position.

5. The filling head according to claim 4, wherein the locking element (38, 138) can be shifted axially with reference to the rotational direction of the operating part (30) and/or the rotary connecting element (26).

6. The filling head according to claim 4, wherein the locking element (38, 138) and/or a coupling element (36) coupled to the operating part (30) or the rotary connecting element (26) has a contact surface that is inclined at an angle to the shifting direction of the locking element (38, 138) or has a curved shape, wherein a force in the shifting direction is applied to the locking element (38, 138) under the effect of the contact surface when torque is transmitted.

7. The filling head according to claim 6, wherein the locking element (38, 138) and/or the coupling part (36) have a first and second contact surface, wherein the first contact surface is active when torque is transmitted in a first direction of rotation, and the second contact surface is active when torque is transmitted in the second, opposite direction of rotation wherein the first and second contact surface have different angles in relation to the shifting direction of the locking element (38, 138).

8. The filling head according to claim 1, wherein the rotary connecting element is a bayonet element or a helically threaded element (26).

9. The filling head according to claim 1, wherein the sensor (41, 141) detects the position of a moving element (38, 162) that moves from a first stable position to a second position when the torque-limiting coupling device (38, 138) is triggered.

10. The filling head according to claim 1, wherein a support element (162) is shifted from a resting position to a triggered position when the torque-limiting coupling device (132) is triggered by the rotation of the operating part (30) in the closing direction and wherein the sensor (141) detects the triggered position and/or the resting position of the support element (162).

11. The filling head according to claim 10, wherein a locking element is provided that keeps the support element (162) in the triggered position after triggering, wherein the support element (162) is returned to the resting position when the operating part (30) is rotated in an opening direction opposite the closing direction.

12. The filling head according to claim 1, wherein a coupling element (160) is connected to the operating part (30), and the support element (162) is mounted in a guide in relation to the coupling element (160) such that it moves from the resting position into the triggered position when the rotary connecting element (26) rotates in relation to the operating part (30).

13. The filling head according to claim 12, wherein the coupling element (160) and the support element (162) are designed as concentrically arranged ring elements, and the guide is arranged in the area between the coupling element (134) and the support element (162).

14. The filling head according to claim 11, wherein a coupling element (260) is connected to the operating part (30), and the support element (262) is mounted in a guide (278) in relation to the coupling element (260) such that it remains in the triggered position after triggering.

15. The filling head according to claim 14, wherein the guide (278) is formed by cams (276) created on one of the coupling element (260) or the support element (262), and pockets (278) created in the other of the coupling element (260) or the support element (262), wherein the cams (276) engage in the pockets (279) in the triggered position.

* * * * *